Patented Mar. 9, 1926.

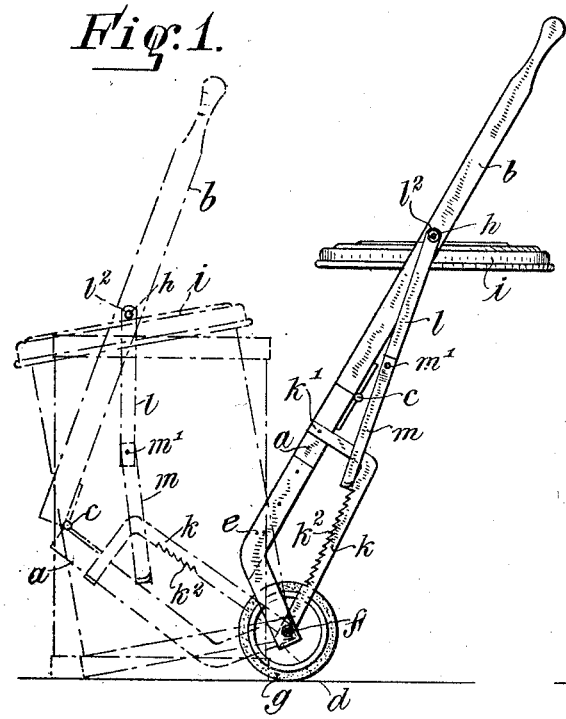

1,576,313

UNITED STATES PATENT OFFICE.

JAMES J. DOLAN, OF NEW ROCHELLE, NEW YORK.

HAND TRUCK.

Application filed June 27, 1925. Serial No. 39,915.

*To all whom it may concern:*

Be it known that I, JAMES J. DOLAN, a citizen of the United States, residing in the city of New Rochelle, in the State of New York, have invented certain new and useful Improvements in Hand Trucks, of which the following is a specification, reference being had to the accompanying drawing, forming a part hereof.

This invention relates particularly to the construction of hand trucks such as are used for the transportation of ash cans and other articles. One of the objects of the invention is to produce a truck of this character in which the ash can, barrel, box or other article to be transported can be engaged with the truck without the application of the hands to the article and in which the article, when once engaged by the truck, shall be secured in position automatically and shall be held so firmly that it cannot be dislodged in any ordinary movement of the truck. Another object is to provide means for the closing of the top of an open can or barrel as it is engaged by the truck so as to prevent the spilling of the contents. Still another object is to produce a truck which shall have adequate strength, shall not be unduly heavy, and shall be capable of manufacture at a reasonable cost.

The invention will be more particularly described hereinafter with reference to the accompanying drawing, in which:

Figure 1 is a view of the improved truck in side elevation, the position of the parts of the truck as it is engaged with an ash can being indicated by broken lines.

Figure 2 is a view of the truck in elevation as seen from the right-hand in Figure 1.

Figure 3 is a view in elevation, partly in section, showing the position of the parts when an ash can has been engaged by the truck, the can being indicated by broken lines.

Figures 4 and 5 show details of construction to be referred to.

The truck comprises two parallel members which constitute the main portions of the truck frame and the handles, each of such members consisting of two portions $a$ and $b$, which are hinged together, as at $c$, so that the member can be flexed in one direction but not in the other. The two members $a$ are connected at the lower end by a cross bar $d$ which is preferably formed as an angle iron, one portion of which is formed with or has welded thereto a member $d'$ which is bent or formed as shown in Figures 1 and 3 and is extended upward along the portion $a$ and is secured thereto by screws or rivets, as indicated.

Another member $e$, also preferably of strap iron, is similarly secured to the other side of the member $a$ and is similarly bent or formed in parallelism with the member $d'$, so as to provide a proper support for the spindle $f$ which provides a bearing for the corresponding wheel $g$ and, being extended through the member $e$ and the member $d'$, is secured by nuts $f'$.

The upper or handle portions $b$ of the main frame members are also connected and held in parallelism by a cross bar or rod $h$ which is properly threaded at its ends and secured by nuts $h'$. On the rod $h$ is hung, so that it may swing freely, a clamping member $i$ which may be formed as a cover for the can or barrel to be transported.

Secured to the lower end of each frame member $a$, $b'$, $e$, as by being engaged by the corresponding bolt $f$, is a locking member $k$ which is preferably bent at the right angle, as shown, and is secured to the frame member $a$ as indicated at $a'$. This locking member is formed with teeth on one edge, as indicated at $k^2$.

A gravity latch member, composed of two parts $l$ and $m$, hinged together as at $m'$ so as to permit flexing, but provided with a stop as at $l'$ so as to prevent flexing in one direction, is pivotally connected with each corresponding handle member $b$, as at $l^2$, as by engagement with the end of the rod $h$. The part $l$ of the gravity latch member may be made of a single strip of strap iron while the part $m$ is preferably made of a strip of strap iron which is looped or bent upon itself so as to straddle the locking member $k$ and to engage the teeth $k^2$ thereof as shown clearly in Figures 4 and 5.

In the use of the improved truck it is advanced toward the can or other article to be transported, with the parts $a$ and $b$ of the main members in alignment, as shown in Figure 1. As the cross member $d$ at the lower end makes contact with the can the foot of the user is placed against the cross member to prevent backward movement and, with the parts *a* and *b* still in alignment, the truck is swung forward until the clamping member or cover *i* is over the can or other article to be engaged. Then, by pressure exerted on the handles, the frame members are flexed at the hinge *c* whereby the clamping member or cover is brought down upon the can, as shown by broken lines in Figure 1. It is to be observed that when the parts *a* and *b* of the main frame members are in alignment the gravity latch *l, m*, rests at its lower end on the upper part of the locking member *k*, and that as the frame members are swung forward, the gravity latch member swings free of the locking member *k*, as shown by broken lines in Figure 1. Then, as the frame members are flexed drawing the clamping member or cover down upon the can or other article and the frame members are drawn back toward the operator and toward the position shown in Figure 3, the gravity latch members engage the teeth of the locking members *k* and so secure the several parts of the truck in their new positions. It will be understood that when the frame members are flexed and the cover is pressed down upon the top of the can, as shown by broken lines in Figure 1, the can is at the same time tilted forward slightly so that the cross member *d*, or the horizontal portion thereof, is pressed by the foot of the operator under the edge of the can. Thereby, when the locking has been effected, as shown in Figure 3, the can or other article is clamped firmly between the cross member *d* and the clamping member or cover *i*. It will be observed that as the new relation of the cross member and the clamping member is maintained by the locking of the latch with the locking member, the can or other article will continue to be clamped between the cross member *d* and the clamping member or cover *i* so that the truck and its load can then be shifted to any position without disengaging the load from the truck. When it is desired to disengage the load from the truck the truck and its load are tilted forward from the position shown in Figure 3 until the load, at its forward edge rests upon the ground or floor. As this movement takes place, the gravity latches are disengaged from the locking members and, with an upward pull on the handles, the parts *a* and *b* of the frame members are brought into alignment, lifting the cover or clamping member from the can or other article, the cross member *d* being at the same time allowed to move back from under the edge of the can or other article.

It will be seen that the truck adjusts itself automatically to the height of the article to be transported. When the truck is not in use it can be flexed on the hinge line and collapsed, the handle portions being folded over upon the other portions of the frame members, the cover lying in between such portions.

It will be understood that various changes in details of construction and arrangement of parts can be made to suit different conditions of use and that, except as pointed out in the claims, the invention is not limited to the particular construction formed and described therein.

I claim as my invention:

1. In a hand truck, a main frame composed of two portions hingedly connected, a cross member at the lower end of the main frame to engage the article to be transported, a clamping member carried by the upper portion of the main frame to engage the top of the article to be transported, and locking devices to retain the parts in clamping position.

2. In a hand truck, a main frame composed of two portions hingedly connected, a cross member at the lower end of the main frame to engage the article to be transported, a swinging clamping member carried by the upper portion of the main frame to engage the top of the article to be transported, and locking devices to retain the parts in clamping position.

3. In a hand truck, a main frame having two side members, each composed of two portions hingedly connected, a cross member connecting the lower portions and adapted to engage the article to be transported, a cross member connecting the upper portions, a clamping member swung on the last named cross member to engage the top of the article to be transported, and clamping devices to retain the parts in clamping position.

4. In a hand truck, a main frame composed of two portions hingedly connected, a cross member at the lower end of the main frame to engage the article to be transported, a clamping member carried by the upper portion of the main frame to engage the top of the article to be transported, a toothed locking bar carried by the lower portion of the main frame, and a latch pivotally engaged with the upper portion of the main frame and adapted to engage the locking member.

5. In a hand truck, a main frame having two side members composed each of two portions hingedly connected, a cross member connecting the two lower portions and adapted to engage the article to be transported, a cross member connecting the two upper portions, a clamping member swung on the last named cross member, toothed locking members secured to the lower portions, and latch members pivotally engaged with the upper portions and adapted to engage the locking members.

6. In a hand truck, a main frame having two side members composed each of two portions hingedly connected, a cross member connecting the two lower portions and adapted to engage the article to be transported, a cross member connecting the two upper portions, a clamping member swung on the last named cross member, toothed locking members secured to the lower portions, and hinged latch members pivotally engaged with the upper portions and adapted to engage the locking members.

This specification signed this 26th day of June A. D. 1925.

JAMES J. DOLAN.